W. T. PRICE.
ELECTRICAL CLUTCH MACHINE.
APPLICATION FILED NOV. 20, 1907.
919,460.
Patented Apr. 27, 1909.
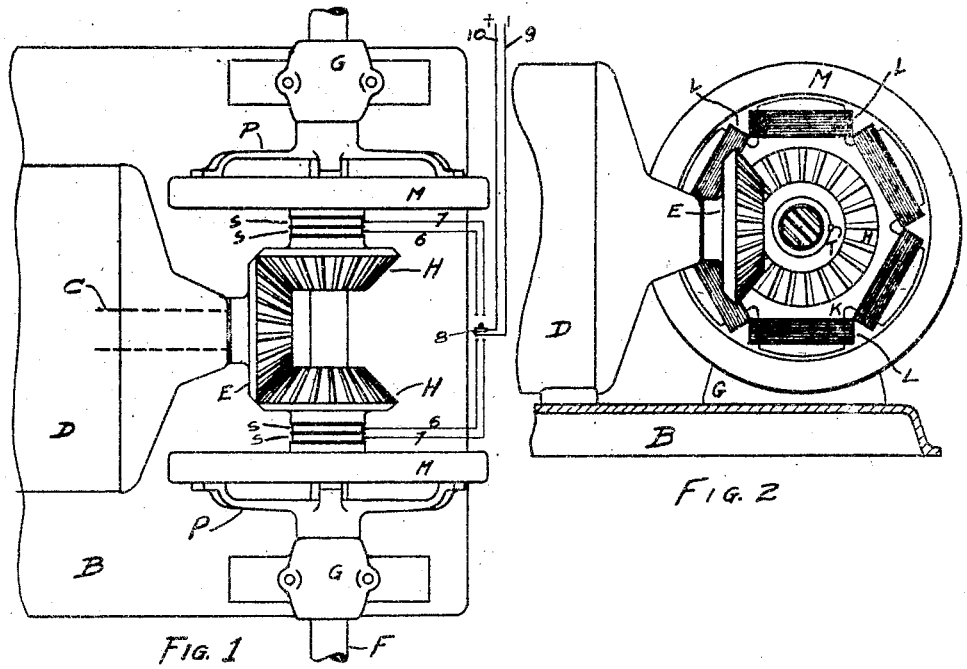
Fig. 1
Fig. 2
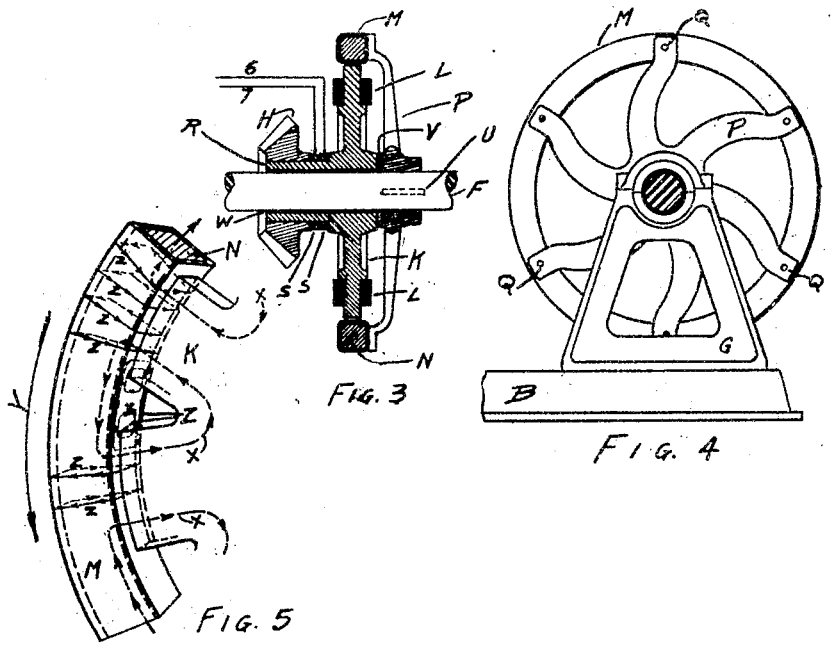
Fig. 3
Fig. 4
Fig. 5
Witnesses:
Geo L Tredo
Walter L. Ruth
Inventor:
William Tudor Price

UNITED STATES PATENT OFFICE.

WILLIAM T. PRICE, OF BUFFALO, NEW YORK.

ELECTRICAL-CLUTCH MACHINE.

No. 919,489.

Specification of Letters Patent.

Patented April 27, 1909.

Application filed November 20, 1907. Serial No. 403,039.

*To all whom it may concern:*

Be it known that I, WILLIAM TUDOR PRICE, a subject of the King of Great Britain, and a resident of Buffalo, in the county of Erie and State of New York, have invented a new and useful Electrical-Clutch Machine, of which the following is a specification.

My invention relates to improvements in electrical clutch machines involving electrical clutches of the induction type. With this type of clutch the operation does not depend upon friction but upon the force exerted on a closed electrical circuit when moved relative to a magnetic field so that the lines of force are thereby cut.

My invention is intended, primarily, to start a driven element from a uniformly rotating driving element through the agency of my electrical induction clutch. When the clutches are used in pairs with equivalent mechanical connections to those herein specified, the electrical clutch machine may then be used not only for starting, but for stopping and reversing the said driven element. The latter combination would be of great service for operating rolling mills, rolling mill tables, plane tables, swing bridges, automobiles and is adaptable for many other uses. Individual clutches may be used for starting members which are intended to rotate in but one direction; a line shaft may be started with the electrical induction clutch and brought to almost the speed of the driving element, then a positive mechanical clutch may be thrown in to supersede the former. The electrical induction clutch may be located in a drive as a protective element, for should the force become excessive the clutch would not transmit it but would slip without injury to itself or its connections.

My electrical induction clutch may be used as in instruments for producing a torque almost in exact proportion to the speed of its driving element. Thus it may be used in tachometers. My electrical induction clutch may also be used as a brake.

The objects of my invention are: First, to provide a powerful electrical induction clutch of high starting torque and low running slip. Second, to provide a compact clutch of the above qualities, of extremely rigid construction so that it may be located in a narrow space and may withstand the rough usage to which such machines are subjected. Third, to provide an electrical induction clutch wherein pole faces, long in the direction of rotation, may be used without excessively increasing the length of the electrical path in the rotor. Fourth, to provide a machine by which, from a constantly rotating driving element, a driven element may be started and stopped and reversed with high acceleration, without wear or other injury to the various drive components. Fifth, to provide an electrical clutch machine of the last named qualities, of compact and attractive design.

The invention is illustrated by the accompanying drawing in which; Figure 1 is a plan view of the electrical clutch machine; Fig. 2 a side sectional view of the electrical clutch machine, the near clutch being removed; Fig. 3 is a cross section of the electrical induction clutch, showing the driving and the driven members and the bevel gear by which the driving clutch member is driven; Fig. 4 is the corresponding end view of the clutch showing also one of the bearings of the electrical clutch machine; Fig. 5 is a diagram, drawn to a larger scale, showing the general locations and directions of the magnetic and electric circuits when the clutch is operating.

Similar characters refer to similar parts throughout the several views.

B is the bed plate on which the machine is assembled, C is the driving shaft which rotates continuously in one direction; in this particular case the shaft C is the armature shaft of the motor D, but the shaft may be driven by any motive power.

E is the driving gear.

F, the driven shaft, is journaled in the bearings G, G, and has mounted thereon two electrical clutches which are alike. In the construction shown, the clutch driving members are loosely mounted on the shaft and are driven in opposite directions from gear E through the bevel gears H, H. The clutch driven members are secured to the shaft by keys U.

It will be readily seen that when one clutch is in operation the driven shaft will rotate in the same direction as the operating clutch driving member, while when the other clutch is thrown into service the shaft will rotate in the opposite direction.

As stated above the two clutches are alike and their construction is as follows: K is the magnetic field casting, preferably a steel casting, on the projecting pole pieces of this casting are mounted the electrical windings L, L, etc. These coils are so connected that when current flows through them adjacent poles are oppositely disposed. The rotor ring "M" is made of two metals preferably in good electrical contact with each other though this condition is not imperative. The inner ring N is of magnetic material, preferably steel, while the outer coating is of copper or other good electrical conducting material. The rotor is held in position to the spider P by the screws Q, Q, etc., the arms of the spider being curved so that the rotor ring may expand when heated without injury to the spider. The magnetic field casting has a long hub R extending from it which carries the two collector rings S, S, and, with the construction shown, the bevel gear H. Key T (Fig. 2) serves to secure the gear to the hub. The collector rings are insulated from the surrounding material by fiber rings and sleeves, but they are connected by wires to the terminals of the field coils. The field casting is bushed as at W to withstand the wear and is separated from the spider by the brass ring V. The spider is secured to the shaft by the key U.

From the construction above specified the magnetic flux will be as indicated by the lines X, X. When this flux is present and there is relative motion between M and K, eddy currents will be generated, which will take paths similar to Z, Z, etc., and when the relative motion is as shown by Y, the currents will have directions shown by the attached arrows. Current is brought to the collector rings by the wires 6 and 7. At 8 (Fig. 1) is a double throw switch, which serves to connect either clutch circuit with the line wires 9, and 10.

The operation of the electrical clutch machine is as follows: The gear E rotates continuously in one direction driving both field castings but in opposite directions. The switch S is in a central position. The shaft F, its two spiders and their rotors are at rest. When the operator wishes to start the shaft, he throws the switch in on one side. This allows the current from the line to energize the field coils of one of the clutches. The magnetic flux X is thus set up. As the moving lines of force sweep through the rotor, the heavy currents are generated therein. These currents cause a drag between the field and the rotor, which drag will drive the rotor and thereby the spider and the shaft. When the operator wishes the reverse shaft rotation, he throws the lever S in on the opposite side.

I am aware that, prior to my invention, electrical clutches of the induction type have been used. These clutches have involved for a rotor a solid copper ring or disk arranged to run between two sets of oppositely disposed poles, the magnetic flux thus passing straight from one pole through the rotor to the opposite pole, but these clutches do not admit of such high starting torques nor such low running slips as will the one herein specified; furthermore, the rotors, which must be thin, are delicate, thus requiring large air gaps, and are difficult to connect to the spider.

With previous electrical induction clutches, in order to provide a path of low resistance for the current, it is necessary to shape the poles so that they are narrow in the direction of rotation. This demands that the reversals of the heavy currents be so rapid that the self induction present, will not permit of said heavy currents being as heavy as desired.

A feature of my invention is the great length of poles allowable in the direction of rotation while an easy path Z, Z, etc., is still available. It will be noted that with the copper in good electrical contact with the steel, the conductivity of the path of the current is still further augmented, for if the magnetic flux admits, at any point on the rotor, the heavy currents may take advantage of the steel as a conductor and take a still shorter path. With a clutch of this type, any reduction in the slip, means not only an increased efficiency, but an increased capacity, for the heating of the rotor will be less.

It was thought best to place the rotor on the outside of the poles for in this latter position it is exposed to the cooling action of the air, increased by the fanning due to the revolving poles. To reduce the gap between the pole faces and the steel of the rotor ring, I may make the inside copper surface thinner than the sides and the outside surface. The construction of this copper covered rotor is made comparatively simple, by the presence in the metal markets of copper clad steel made by the new Monnot process.

Having thus described my invention I claim:

1. In an electrical induction clutch, the combination of a field magnet and a rotor of magnetic material completely covered with a good electrical conducting material; said rotor being revolubly mounted with respect to said field magnet.

2. In an electrical induction clutch, the combination of a rotor and a field magnet having a common axis and mounted to admit of relative rotations; said rotor consisting of a ring of magnetic material and coating of good electrical conducting material which permits of electrical circuits around the magnetic material in planes which contain the axis; said field magnet having a plurality of poles arranged to transfer magnetic flux one to another, through the rotor.

3. In an electrical induction clutch, the combination of a field magnet having a circular series of poles; electrical windings for exciting adjacent poles to opposite polarity; a rotor consisting of a ring of magnetic material and an attached enveloping coating of copper, said rotor axially and revolubly mounted relative to said field magnet, and arranged to carry magnetic flux between the said adjacent poles.

4. In an electrical induction clutch, the combination of a field magnet having a plurality of poles in a plane perpendicular to the axis of rotation, and a rotor revolubly mounted in the plane of the magnetic poles; said rotor consisting of a ring of magnetic material and an attached enveloping coating of copper.

5. In an electrical induction clutch, the combination of a shaft; a field magnet revolubly mounted on said shaft, said field magnet having a series of radial pole pieces in a plane perpendicular to the axis of rotation; of electrical windings mounted on said pole pieces, connected in such manner as would excite adjacent poles to opposite polarity; means for conveying electric current to said windings; a rotor spider secured to said shaft; a copper clad steel rotor ring secured to said rotor spider, surrounding said field magnet in the plane of said radial pole pieces and arranged to carry magnetic flux from each pole to the adjacent poles substantially as set forth.

6. In an electrical induction clutch, the combination of a field magnet having a plurality of radial pole pieces in a plane perpendicular to the axis of rotation; of electrical windings mounted on said pole pieces, connected in such manner as would excite adjacent poles to opposite polarity; means for conveying electric current to said windings; and a copper clad steel rotor ring surrounding said pole pieces revolubly mounted with respect to said field magnet, substantially as set forth.

7. In an electrical induction clutch machine, the combination of a driving element; two electrical induction clutches, each having a driving and a driven member; drive connections between said driving element and one of said driving clutch members to rotate the latter in one direction; drive connections between said driving element and the other of said driving clutch members to cause the latter to rotate in the opposite direction; a driven element; drive connections between one of said driven clutch members and said driven element to cause one direction relation between the two; drive connections between the other of said driven clutch members and said driven element to cause the same direction relation between the two; and controlling means for alternately energizing the clutches.

8. In an electrical induction clutch machine, the combination of a driving element; two electrical induction clutches, each having a driving and a driven member; a driven shaft having said clutch driven members secured to same and having said clutch driving members revolubly mounted thereon; a gearing connecting said driving element with one of said driving clutch members to rotate the latter in one direction, a gearing connecting said driving element with the other of said driving clutch members to cause the latter to rotate in the opposite direction; and controlling means which operates to alternately energize the clutches substantially as set forth.

Witness my hand this 18th day of November 1907.

WILLIAM T. PRICE.

Witnesses:
GEO. L. TREDO,
WALTER L. RUTH.